July 21, 1936.  B. JOHNSEN  2,048,389
SAFETY DEVICE
Filed Dec. 1, 1933
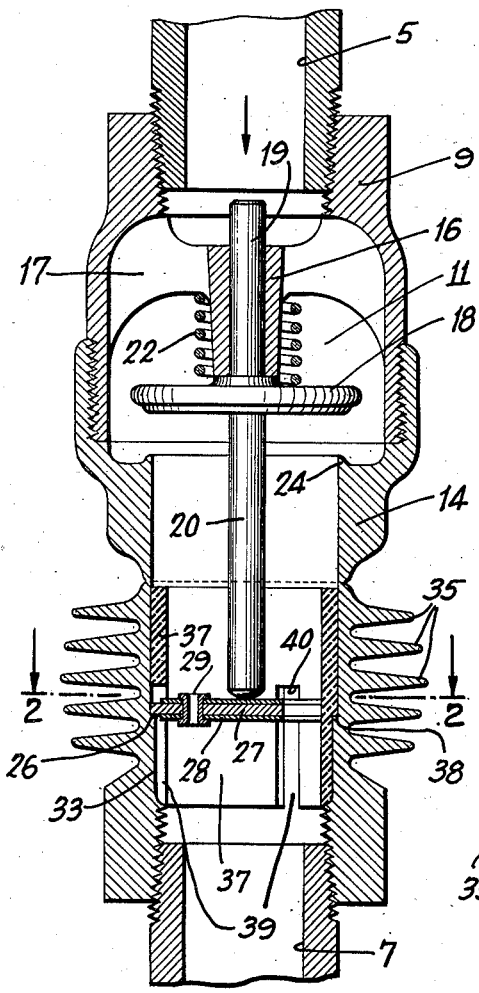
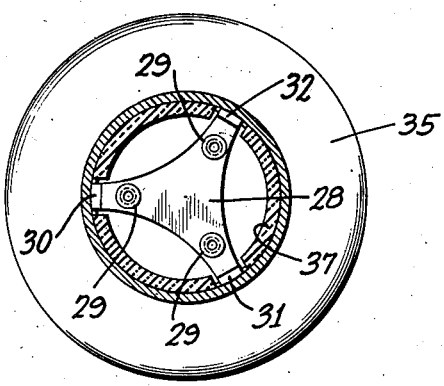
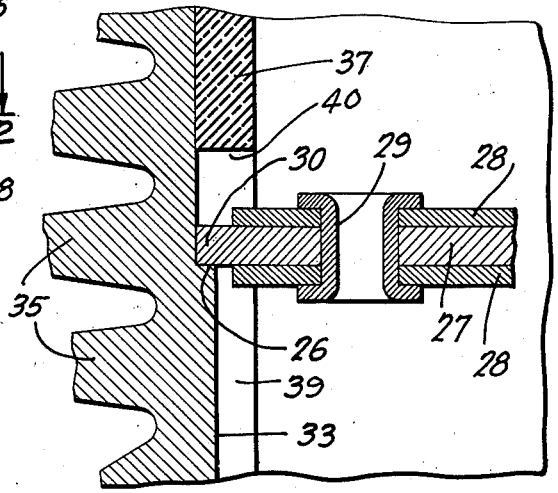
INVENTOR
BJORNULF JOHNSEN Patented July 21, 1936

2,048,389

UNITED STATES PATENT OFFICE 2,048,389

SAFETY DEVICE

Bjornulf Johnsen, Summit, N. J., assignor to Harry T. Goss and Bjornulf Johnsen, copartners trading under the firm name and style of Goss & Johnsen, New York, N. Y.

Application December 1, 1933, Serial No. 700,443

15 Claims. (Cl. 137—162)

This invention relates broadly to the control of fluid, either liquid or gaseous, flowing through a conduit.

More particularly, the invention relates to the stopping of the flow of fluid automatically upon the occurrence of a certain event such as, for instance, a change in the temperature, beyond a predetermined range, in proximity thereto.

One object of the present invention is to provide a device which is responsive to a predetermined temperature to close a conduit for fluid of any character. Accordingly, a valve is placed in the conduit, which valve has a tendency to close but is retained in open position by a device operative to hold the valve open, but rendered inoperative at a predetermined temperature to permit the valve to close. More particularly, the means which holds the valve in its open position against, say, the action of a spring tending to close the same may be, at least in part, of a material fusible at a predetermined temperature.

The invention also has for its object a disposition, within the conduit, of the temperature responsive element which holds the valve in open position.

It is also an object of the invention to provide for the rapid transfer of heat from the exterior of the fluid passage to the interior and to the element responsive to the predetermined temperature.

Yet another object is to prevent the dissipation of the heat conducted through the walls by the fluid flowing therewithin. To this end, the fluid may be substantially separated or isolated from the heat transferring wall, conveniently, by a wall either non-conductive to heat or refractory. Such insulation is particularly applicable when the fluid is a liquid.

It is a further object of the invention to incorporate the valve and its associated controlling means in a self-contained unit adapted to be interposed in a fluid conduit at a desired point.

The invention further seeks, for the control of a member movable for any purpose whatsoever, an element responsive to a given set of conditions as, for instance, a change in temperature, which responsive element may, if desired, be replaceable.

The invention also seeks a device of the character described, which is practical from the standpoint of ease and cheapness of manufacture and convenience and reliability in installation and use.

In one of its aspects, the invention relates to a valve controlling the flow of an inflammable liquid, such as gasoline, delivered, say, through a hose to a vehicle tank from a fluid dispensing device adapted to dispense gasoline and other liquid fuels at roadside service stations and the like, of the kind in which the pump is automatically actuated, as by a motor. In such fluid dispensing devices heretofore known, the operator, upon removing the nozzle from its support, starts the motor, for instance, by closing the circuit, manually or otherwise, and then moves to the vehicle tank where he can see exactly how much the tank will hold and serve it without spilling. If, while the fluid is being delivered, a fire should break out, the flames of the burning fluid enveloping the hose or the heat therefrom might be sufficient to prevent the operator from returning to the dispensing device to shut off the motor with the result that the pump would continue to deliver inflammable fluid and feed the fire, thus rendering possible a conflagration of great extent and also increasing materially the fire hazard. When it is considered that underground storage tanks for gasoline sometimes have a capacity of one thousand gallons, which is delivered by the service pump at the rate of 12 or 15 gallons per minute, it will be readily appreciated that the fire hazard in connection with such fluid dispensing devices is a great one.

In another of its aspects, the invention is applicable as a safety valve in a pipe line conducting illuminating gas, say, into or throughout a building, as at the meter in the service line from the gas main in the street. Or such a safety valve may be disposed on each floor or in each branch pipe line in a building. In any event, should a fire break out, the valve will automatically close the conduit.

The invention is equally applicable to the conduit conducting fuel oil to burners, say, on shipboard or in buildings, for the same purpose.

In carrying the invention into effect it is proposed to insert a valve casing within a conduit, which valve casing has a valve seat toward which a valve tends to move under the influence of yielding means. A tubular conduit portion associated with the valve casing is conveniently provided with a shoulder upon which a bridge piece is carried for engagement by the valve stem in valve open position. The bridge piece or at least that portion thereof in contact with the inner wall of the conduit portion is fusible and, if desired, a shield may be disposed within the conduit portion proximate the bridge piece to shield the conduit portion from the fluid passing therethrough, particularly where the valve is adapted to control the flow of a liquid which would otherwise come in contact with the conduit portion at that point and serve to carry the heat away from the conduit portion and maintain the temperature below that at which the fusible portion of the bridge piece is fusible.

The invention also seeks a device of the character described, which is practical from the standpoint of ease and cheapness of manufacture and convenience and reliability in installation and use.

These and other objects of the invention and the means for their attainment will be more apparent from the following detailed description taken in connection with the accompanying drawing illustrating various embodiments by which the invention may be realized, and in which:—

Figure 1 is a view in longitudinal section showing a controlling device for a fluid passage, the valve and valve stem being illustrated in elevation;

Figure 2 is a transverse sectional view taken in the plane indicated by the line 2—2 of Figure 1, looking in the direction of the arrows;

Figure 3 is an enlarged view in longitudinal section showing one end of a bridge piece carried with the wall of a conduit portion insulated from the flow of fluid therethrough.

In the illustrated embodiment, the safety device of this invention is adapted to be interposed in a conduit or pipe line adapted to conduct fluid, either liquid or a gas. The proximate ends of pipe sections are indicated at 5 and 7 conveniently threaded for insertion in the controlling member of this invention.

Threaded at one extremity on to one pipe end, say, 5, is a casing member 9 slightly enlarged as at 10 to form a valve chamber 11 and threaded at its other extremity 12 to receive a companion casing member 14 having a conduit portion.

The casing member 9 is provided with a centrally disposed bearing member 16 carried by spider-like arms 17 whereby the flow of fluid is not obstructed. A valve member 18 is adapted to reciprocate in the valve chamber 11 and there extends from opposite sides of said valve, valve stem portions 19 and 20, the valve stem portion 19 being slidable in the bearing 16 while the valve stem portion 20 extends into the conduit portion 14. A spring 22 encircling the bearing member 16 and guided thereby, bears against the arms 17 on the one hand and the valve member 18 on the other hand and tends to urge the valve member against a seat 24 formed on the conduit portion 14.

At a convenient distance below the seat 24, the conduit portion 14 is formed with a shoulder 26 adapted to support a bridge member or abutment against which the valve stem portion 20 abuts and by which the valve is held in valve open position. The shoulder 26 is preferably annular and is of no greater width in a radial direction than is necessary to offer a support for the bridge member 27—32.

In the illustrated embodiment, the bridge member is illustrated as of spider-like form having three arms defining equal angles. This abutment or bridge member is laminated and comprises a central lamination 27 conveniently entirely of a material fusible at a predetermined temperature. Above and below the lamination, that is, on either side thereof, there is disposed a lamination 28 of a material not fusible at any temperature near the temperature at which the lamination 27 is fusible and having greater tensile strength than the lamination 27. These laminations 28 and 28 are substantially the same shape as the lamination 27 except that their arms are shorter as shown in Figure 3 so as to leave ends 30, 31, and 32 of the fusible lamination 27 exposed. In fact, the laminations 28 are of such size as to be in diameter less than the interior diameter of the conduit portion indicated at 33, i. e., that portion below the shoulder 26, so that if one of the exposed ends 30, 31 or 32 fuses, the abutment member may fall freely downwardly in the conduit portion. Such a laminated construction has a great degree of rigidity and in order to lend the greatest degree of strength to the spider, rivets or eyelets 29 secure the laminations 27 and 28 together and these rivets 29 are disposed as close to the ends 30, 31, and 32 as is practically possible.

The conduit portion 14 proximate the shoulder 26 is conveniently formed with a plurality of fins 35 adapted to absorb heat from the surrounding atmosphere and conduct it to the wall of the conduit portion, thereby raising the temperature of that wall faster than would otherwise be the case if the fins were not present. This heat, of course, is transmitted to the protruding ends 30, 31, and 32 of the fusible portion of the abutment. Where the conduit 5, 7 conducts a gas such as illuminating gas, the contact of the flowing fluid through the conduit portion 14 will not serve to conduct heat away from the wall in proximity to the fusible ends 30, 31, and 32, swiftly enough or sufficiently to retard the operation of this device but, if the fluid flowing through the conduit is a liquid, heat will be conducted away from the walls and the device will not be as sensitive to dangerous temperatures in the surrounding area. In order to prevent liquid flowing through the conduit from absorbing the heat from the wall 14, a tubular shield of heat insulating or non-conducting material, such as indicated at 37, may be provided. The shield may be provided with a shoulder 38 adapted to rest upon the shoulder 26 of the conduit portion 14 and be supported thereby and is provided with longitudinally extending slots 39 of a size to receive the fusible ends 30, 31, and 32 so that the cylindrical shield will fit down over the arms and protect the wall of the conduit portion below the shoulder, at least in all portions except those immediately below the arms of the spider. These slots 39 extend upwardly for a predetermined distance above the shoulder 38 for a reason which will be apparent hereafter when the operation of the device is described. The shield 37 may be formed of any convenient material preferably one which does not conduct heat readily.

The operation of the device will be apparent to a certain extent from the foregoing description. The arms of the reenforcing laminations 28 should be long enough so that only a very small fusible end 30, 31 or 32 is exposed, as the pressure of the valve stem against the spider will have a tendency to shear the relatively soft material of the fusible portion of the shoulder 26. While the entire lamination 27 is illustrated as fusible and while it will be found most convenient to so construct the lamination 27, it will be obvious that so far as the operation of the device is concerned, only the protruding ends 30, 31 and 32 need be fusible. Should a fire break out in close proximity to the conduit 5, 7 or the temperature be otherwise raised, situations may arise where the temperature only reaches what may be called the critical temperature on one side of the pipe, say, proximate the arm 32. Heat will be quickly absorbed from the flame by the fins 35 and conducted to the wall of the conduit portion 14 and transmitted thereby to the fusible end 32, which will quickly fuse when the temperature reaches that temperature at which it is desirable that the valve should close. So soon as the end 32 fuses, the pressure of the valve stem will force the spider downwardly at the fused end 32 and the arms 30 and 31 will rock about the edge of the shoulder 26 as a fulcrum until the end of the valve stem portion 20 has slipped downwardly, possibly along side of the tilted spider. It is to receive and permit the free tilting of the arms 30, 31 and 32 that the chamber or space 40 in continuation of the slot 39 is formed above the shoulder 38. By making the shoulder 26 relatively shallow only a small amount of the material 27 will have to fuse before the abutment gives way and permits the valve 18 to close upon ts seat 24. By the construction described, the valve operates to close upon its seat substantially by the weight of the parts and the fluid pressure against the upper face of the valve, and the spring 22 may be relatively weak, not sufficient to shear or bend the relatively soft ends 30, 31 or 32.

Various modifications will occur to those skilled in the art in the configuration, composition and disposition of the component elements going to make up the invention as a whole as well as in the elimination of certain features or addition of other features to meet existing requirements, and no limitation is intended by the phraseology of the foregoing specification or illustrations in the accompanying drawing.
What is claimed is:—

1. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a fusible bridge piece carried with the shoulder and engaged by the valve stem in valve open position and a shield disposed within the conduit portion proximate the bridge piece.

2. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion and a fusible bridge piece carried with the shoulder and engaged by the valve stem in valve open position comprising a fusible lamination and a reenforcing lamination, an end of the fusible lamination protruding beyond an end of the reenforcing lamination to rest on the shoulder.

3. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion and a fusible bridge piece carried with the shoulder and engaged by the valve stem in valve open position comprising a fusible lamination and a reenforcing lamination, the ends of the fusible lamination protruding beyond an end of the reenforcing lamination to rest on the shoulder and means proximate the ends securing the laminations together.

4. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion and a fusible bridge piece carried with the shoulder and engaged by the valve stem in valve open position comprising a fusible lamination and an infusible reenforcing lamination disposed on either side of said fusible lamination, an end of the fusible lamination protruding beyond an end of the reenforcing laminations.

5. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, an annular ledge in the conduit portion and a spider having at least three equally spaced arms carried with the ledge and engaged by the valve stem in valve open position, the ends of the respective arms being fusible at a predetermined temperature and supported by the ledge.

6. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a bridge piece whereof the ends only are fusible and are carried with the shoulder and engaged by the valve stem in valve open position and shielding means within the conduit portion through which the fluid is conducted out of contact with the conduit wall.

7. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a bridge piece whereof the ends, at least are fusible and are carried with the shoulder and engaged by the valve stem in valve open position and tubular shielding means within the conduit portion through which the fluid is conducted out of contact with the conduit wall, said shielding means being longitudinally slotted to permit the passage of the ends of the bridge piece.

8. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a bridge piece whereof the ends, at least, are fusible and are carried with the shoulder and engaged by the valve stem in valve open position and shielding means formed with a shoulder to seat on the shoulder formed within the conduit portion through which the fluid is conducted out of contact with the conduit wall.

9. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a bridge piece whereof the ends, at least, are fusible and are carried with the shoulder and engaged by the valve stem in valve open position and tubular shielding means within the conduit portion through which the fluid is conducted out of contact with the conduit wall, said shielding means being longitudinally slotted from the lower end to a predetermined point above the bridge piece to permit the passage of the ends of the bridge piece and to permit an unfused end thereof to tilt upwardly when another end fuses.

10. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion, a spider having at least three equally spaced arms the ends of which are carried with the shoulder and engaged by the valve stem in valve open position, the ends of the respective arms being fusible at a predetermined temperature and rigid means carried with the spider.

11. A safety device of the character described comprising, the combination with a conduit, of a valve casing insertable therein having a valve seat, a valve having a valve stem, means to guide the valve for reciprocation axially of the casing, power storing means tending to urge said valve on the seat, a tubular conduit portion into which the valve stem extends, a shoulder formed in the conduit portion and a laminated spider having at least three equally spaced arms the ends of which are carried with the shoulder and comprising an inner fusible lamination, outer rigid laminations whereof the arms are shorter than the arms of the fusible lamination, rivets proximate the ends of the rigid lamination securing the laminations together, one of said rigid laminations being engaged by the valve stem in valve open position.

12. A destructible bridge piece adapted to be supported within the fluidway of a safety valve responsive to predetermined temperatures to retain a valve in valve open position comprising a fusible lamination and at least one rigid lamination secured thereto, at least the ends of the fusible lamination extending beyond the rigid lamination.

13. A safety device of the character described comprising, the combination with a conduit, of a valve casing insertable therein having a valve seat, a valve having a valve stem, means to guide the valve stem for reciprocation of the valve axially of the casing, yielding means tending to urge said valve on the seat, a tubular conduit portion into which the valve stem extends, an annular shoulder formed in the conduit portion and a spider having at least three equally spaced fusible arms carried with the shoulder and engaged by the valve stem in valve open position.

14. A safety device of the character described comprising a valve casing having a valve seat, a valve normally tending to move into engagement with said seat, said valve casing comprising a ledge, a bridge piece comprising a fusible portion carried by the ledge, said bridge piece engaged by the valve and holding it in valve open position and shielding means proximate the ledge to conduct fluid out of contact with the casing wall and reduce heat transfer between the casing wall and a fluid.

15. A safety device of the character described comprising a valve casing having a valve seat, a valve normally tending to move into engagement with said seat, said valve casing comprising a ledge therein, a spider having three equally spaced arms carried with the ledge at least the ends of which are fusible, said spider engaging the valve and holding it in open position.

BJORNULF JOHNSEN.